C. GRAY.
PARACHUTE FOR AEROPLANES.
APPLICATION FILED APR. 25, 1918.
1,324,392.
Patented Dec. 9, 1919.
2 SHEETS—SHEET 2.
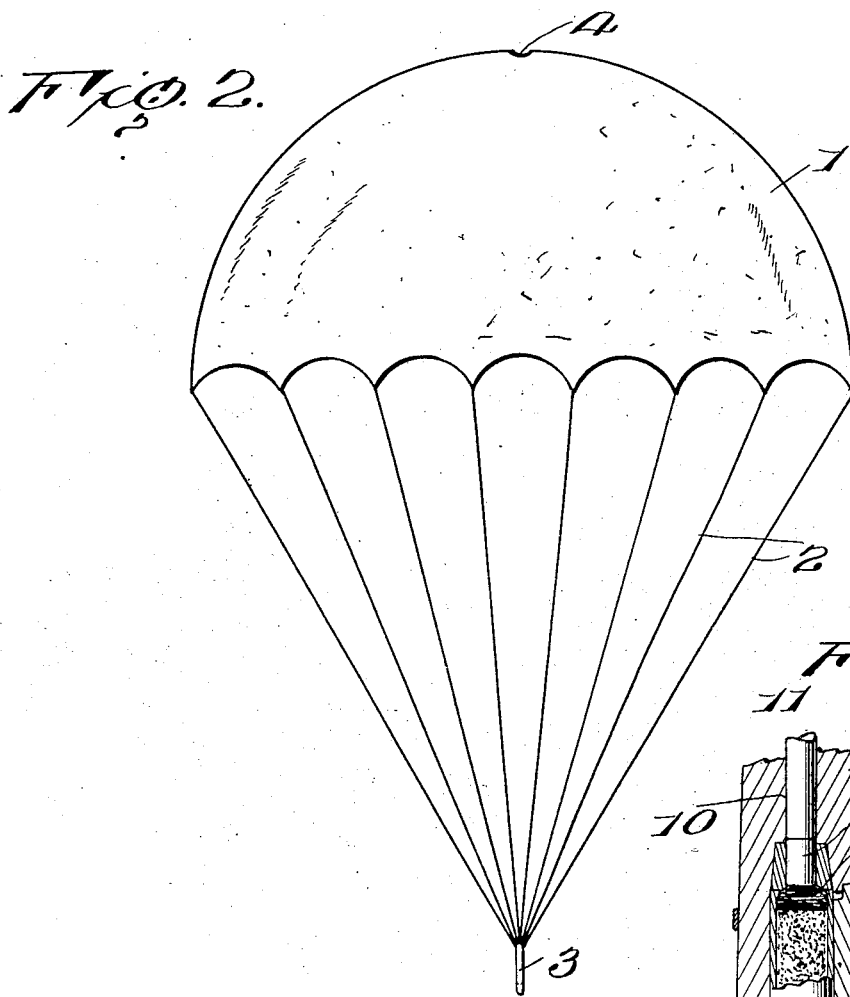
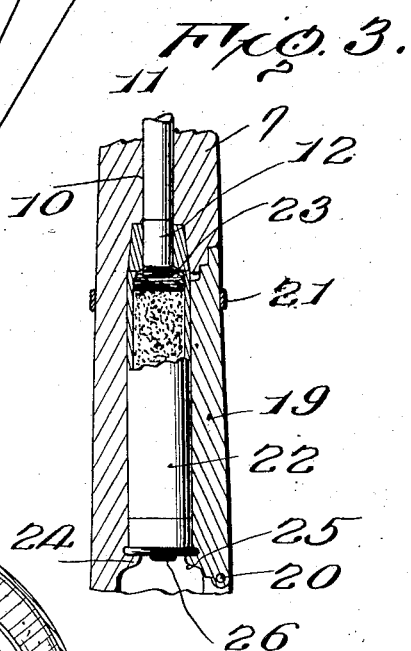
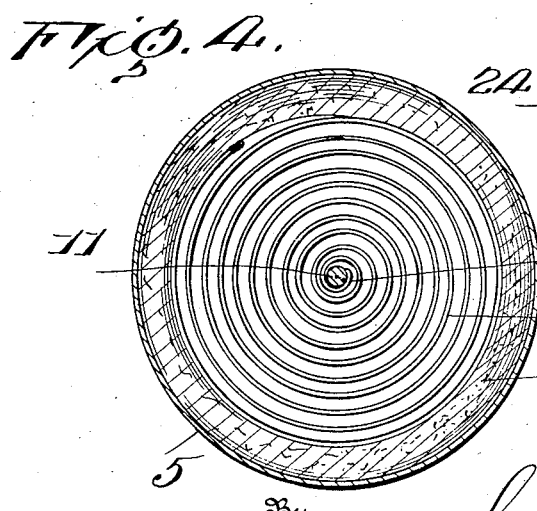
Inventor
Clinton Gray
By
Lacy & Lacy Attorneys

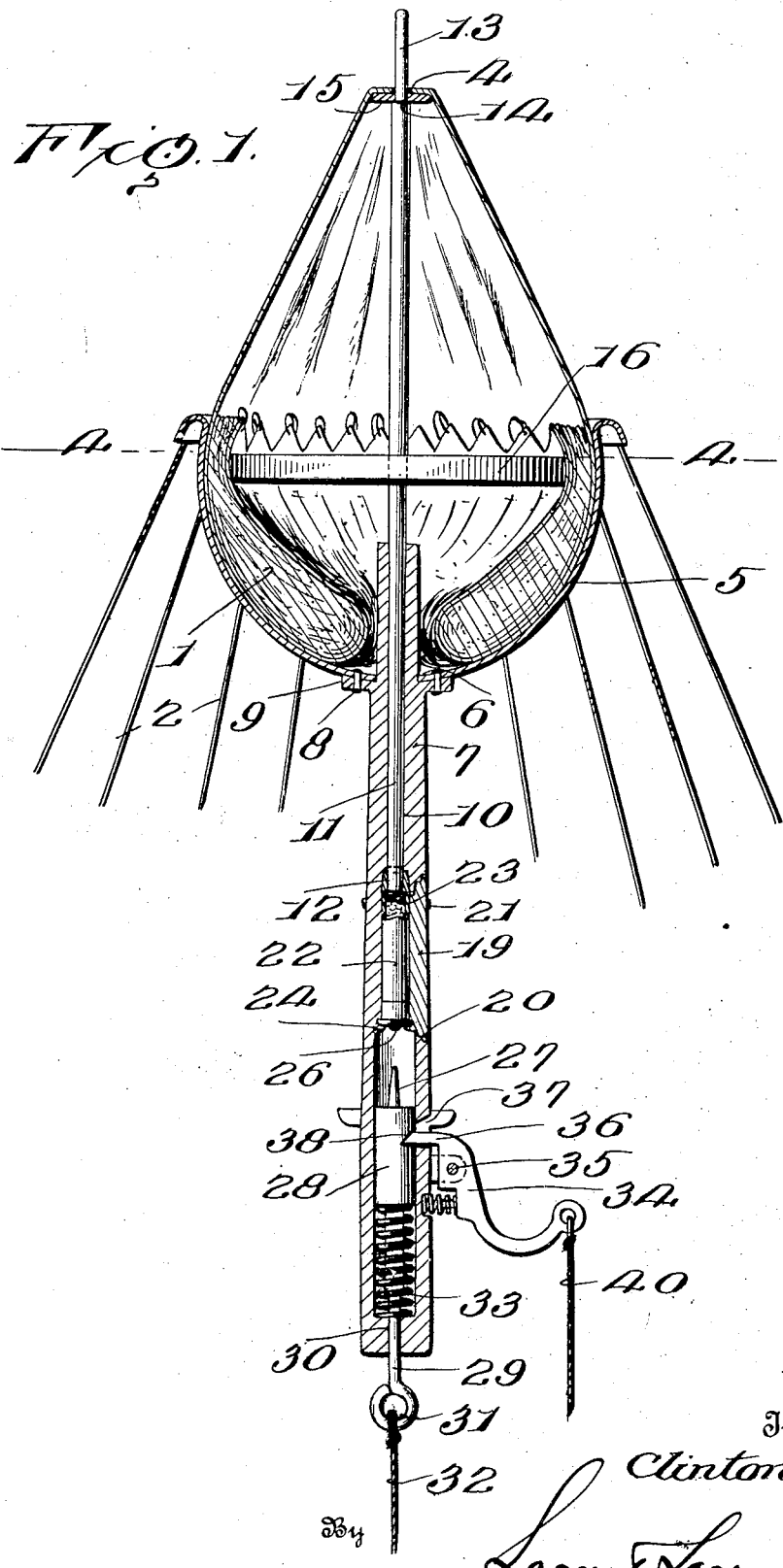

UNITED STATES PATENT OFFICE.

CLINTON GRAY, OF ATLANTIC CITY, NEW JERSEY, ASSIGNOR OF ONE-FOURTH TO MUNJEG K. BOYAJIAN, ONE-FOURTH TO ELEANOR BOYAJIAN, AND ONE-FOURTH TO ELIZABETH GRAY, ALL OF ATLANTIC CITY, NEW JERSEY.

PARACHUTE FOR AEROPLANES.

1,324,392.   Specification of Letters Patent.   Patented Dec. 9, 1919.

Application filed April 25, 1918. Serial No. 230,838.

*To all whom it may concern:*

Be it known that I, CLINTON GRAY, a citizen of the United States, residing at Atlantic City, in the county of Atlantic and State of New Jersey, have invented certain new and useful Improvements in Parachutes for Aeroplanes, of which the following is a specification.

This invention relates to parachutes and has as its primary object to provide a parachute designed especially for employment in connection with aeroplanes and other air craft, insuring the gradual descent of the machine and passengers in the event of breakage of one or more of the sustaining planes or the occurrence of other trouble which would prevent safe landing.

A further object of the invention is to provide a parachute, and means designed for attachment to any suitable portion of the aeroplane or other air craft and capable of actuation to impel the parachute into the air and immediately expand or spread the same so that in the event of accident the parachute may be brought into instant use and, being also connected with the machine, will sustain the same and provide for its gradual and safe descent.

Another object of the invention is to provide means for normally housing the entire parachute in collapsed condition and in compact form so that its presence upon the machine will not act as an incumbrance, and also to house the spreading means within the collapsed parachute.

In the accompanying drawings:

Figure 1 is a vertical sectional view through the parachute and the impelling means embodying the present invention;

Fig. 2 is a side elevation of the parachute expanded;

Fig. 3 is a detailed vertical sectional view illustrating a portion of the firing mechanism for impelling the parachute;

Fig. 4 is a horizontal sectional view on the line 4—4 of Fig. 1, looking in a downward direction.

The parachute in itself is substantially of the same construction as the ordinary parachute and comprises the usual flexible body 1 which may be collapsed when not in use, but which will expand when the parachute is freed in the air and is supporting a weight. The usual supporting ropes or cables 2 are connected to the body 1 at the edge thereof, and these cables at their lower ends are connected together by a ring or other suitable attaching element 3 which in turn is secured to any convenient portion of the aeroplane or other air craft. Of course, when a single parachute is employed the ring 3 will be connected with the machine as near as possible to the center of gravity, but two or more of the devices may be arranged upon a machine if found necessary and their arrangement will, of course, be such that the machine when supported solely by the parachutes, will maintain as nearly as possible a level position. For a purpose to be presently explained, the body 1 is formed centrally with an opening 4 and the body will be suitably reinforced around this opening so as to prevent tearing of the body through the force of any air currents rising through the said opening.

In addition to the parachute, the device comprises means for normally housing the parachute in a collapsed condition, means arranged within the collapsed parachute having a normal tendency to expand and designed to expand or spread the body of the parachute when the parachute is fired or impelled, and a firing or impelling means which when actuated will impel the parachute upwardly from its housing. The housing is indicated in general by the numeral 5 and preferably comprises a cupped or bowl-like body having its open mouth presented upwardly and preferably slightly contracted. The bowl at its bottom is formed with an opening 6 which receives the upper end of the barrel 7 of the firing device, and the said bottom is secured by rivets or other suitable fastening elements 8 to a circumscribing flange 9 formed upon the barrel near its upper end. The upper portion of the barrel, however, projects a considerable distance upwardly into the bowl so that when the parachute is collapsed within the wall of the bowl its folds will be prevented from becoming tangled, which would be likely to interfere with spreading of the body of the parachute when impelled therefrom. The barrel 7 has its bore indicated in the drawings by the numeral 10, and removably fitted in the upper portion of this bore is a rod 11 which projects upwardly beyond the upper end of the barrel and in fact beyond the open mouth of the housing bowl 5. The lower end of the rod 11 is preferably slightly tapered so as to fit in a slight taper 12 in the bore 10 to limit the downward movement of the rod. At its upper end the rod 11 is reduced in diameter as indicated by the numeral 13 so as to provide a shoulder 14 and fitted to the reduced end of the rod and resting upon the shoulder is a washer or disk 15 of cardboard or some other light and readily torn, although somewhat rigid material. In assembling the parts thus far described, the rod 11 is fitted into the bore 10 in the manner clearly shown in Fig. 1 of the drawings and the upper reduced end of the rod, carrying the washer 15, is then inserted through the opening 4 in the body 1 of the parachute. The washer 15 being of a diameter greater than the diameter of the opening 4, the central portion of the body of the parachute will, of course, be supported by the washer and rod 11 in the manner shown in Fig. 1. The remainder of the parachute body is then gathered in and arranged as evenly as possible within the bowl 5, as shown in the said figure, and the ropes or cables 2 are led over the upper edge of the housing and the ring 3 is connected to any suitable portion of the machine. As stated, it is preferable that the folds in the parachute body be arranged to surround the upper end of the barrel 7 so that the folds will be held separated as far as possible.

The means provided for spreading the parachute after it has been impelled into the air is clearly shown in Fig. 4 of the drawings and comprises a spiral spring 16 mounted on or preferably secured at one end as at 17 to the rod 11 but free at its other end, and this spring is relatively tightly coiled or wound about the rod so as to be of minimum diameter and is retained in this form until the folds of the parachute body have been arranged within the housing 5 whereupon the spring may be allowed to expand slightly, so that it will press outwardly in all directions against the said folds. The spring, while in the position shown in Fig. 1, serves to lightly bind the folds of a parachute body against the inner surface of the wall of the bowl where its mouth is contracted so as to prevent accidental displacement of the parachute body from the bowl which might otherwise be caused by air currents, but it will be understood that when the parachute body has been impelled from the bowl the spring will expand fully through its inherent resiliency thus immediately spreading out the body of the parachute so that the same will at once become effective.

Below its tapered portion 12, the bore 10 is slightly enlarged so as to form a cartridge chamber and this chamber is closed at one side by a breech block 19 hinged as at 20 at one side of the barrel and adapted to be held closed by any suitable latch device or, if desired by a ring 21 which may be raised and lowered upon the barrel and will be adapted in its lowered position to encompass the barrel at a suitable distance below the free end of the breech block 19, the barrel being exteriorly slightly tapered. When the breech block 19 is swung to open position, a cartridge 22 may be introduced into the cartridge chamber with its wadded end 23 contacting or substantially contacting the lower end of the rod 11 which rod corresponds in the operation of the device, to the bullet of an ordinary rifle cartridge. Of course the cartridge 22 employed in connection with the device will be a blank cartridge and of a caliber sufficiently large to perform its function of driving the rod 11 from the barrel 7 when the cartridge is fired. The lower end or rim of the cartridge is supported upon a shoulder 24 formed within the lower end of the cartridge chamber, and preferably a similar shoulder 25 is provided upon the inner face of the breech block 19 to also assist in engaging the rim of the cartridge as shown in Fig. 3. The cartridge is provided with the usual cap 26 designed to be struck by the pin of the firing mechanism which will now be described.

The firing mechanism includes a firing pin 27 carried by a plunger head 28 slidably fitted in the lower end of the bore of the barrel 7. The said plunger head 28 is provided at its lower end with a stem 29 which projects through the lower reduced end 30 of the said bore and is provided with an eye 31 for the connection of a cable or other pull device 32. A spring 33 is arranged upon the stem 29 within the bore of the barrel and bears at its upper end against the lower end of the plunger head 28 and at its lower end against the shoulder formed by reducing the lower end of the bore of the barrel. A trigger 34 is pivotally mounted as at 35 upon one side of the barrel and is provided above its pivot with a finger 36 which projects through an opening 37 in the side of the barrel and engages in a notch 38 formed in the corresponding side of the plunger head 28. A spring is aranged between the said side of the barrel and the trigger 34 below the pivot 35 for the latter and holds the finger 36 in engagement in the notch 38. A suitable pull element such for example as a cable 40 is connected to the outer or lower end of the trigger and may be pulled for the purpose of swinging the trigger upon its pivot to release the plunger head carrying the firing pin.

From the foregoing description of the invention it will be understood that the barrel 7 is to be secured or mounted in any suitable manner upon any convenient portion of the aeroplane or other air craft and that normally the device will be loaded with the cartridge 22, the firing pin 27 being retracted by pulling upon the cable 32 against the tension of the spring 33 and being held retracted by the engagement of the finger 36 of the trigger 34 in the notch 38. When the emergency arises, it is only necessary to pull upon the cable 40 whereupon the firing pin will be released, the cartridge will be fired, the rod 11, which is in effect a projectile, will be impelled upwardly into the air carrying with it the parachute, and the parachute will be spread or expanded by the spring 16 which as soon as it starts upward slips out of confinement within the contracted mouth of the bowl. The cables 2 next become taut and the parachute suddenly ceases its upward movement relative to the air craft. If the momentum of the projectile or rod 11 is sufficient to carry it onward, it tears or fractures the washer 15, rises through the hole 4, draws out of the spring 16, and flies away into space, leaving the spring free to fall upon or through the cables. If the momentum be not so great or if the spring be secured to the rod, the latter may or may not fracture the washer but will probably be projected only part way through the hole 4 wherein it will hang suspended through frictional engagement and support the spring, or both may drop back upon the cables 2; while the parachute, which has now caught the upward rush of air, retards the descent of the craft and prevents a disastrous landing.

Having thus described the invention, what is claimed as new is:

1. In a device of the class described, a cupped housing adapted to contain the body of a collapsed parachute, a barrel opening through the bottom of the housing and containing firing means, a projectile seated in the barrel and engageable with the parachute, and a spiral spring fast at its inner end on said projectile and its coils compressed within the parachute body and housing but freed and permitted to expand when lifted from the housing.

2. In a device of the class described, a housing for a parachute, a barrel extending into the housing, a projectile member fitted in the barrel, means for discharging the projectile member from the barrel, a readily torn washer carried by the projectile member, and a parachute having an opening in its body receiving the portion of the projectile member above the said washer, the said body of the parachute resting upon the washer.

3. In a device of the class described, a bowl-like housing, a parachute folded and disposed within the housing with its central portion lying above the housing, a barrel extending into the housing and having its end surrounded by the folded parachute, a projectile rod having its lower end fitted in the barrel and its upper end removably engaging the said central portion of the parachute, means for discharging the rod from the barrel, and a radially expansible spring fast on said rod and contracted within the parachute and the wall of the housing and arranged, when the parachute is dislodged from the housing to expand and spread the parachute.

4. In a device of the class described, a bowl-like housing, a barrel opening through its bottom, a projectile rod mounted in and adapted to be fired from the barrel, the upper end of the rod being reduced and shouldered, a readily torn washer mounted on the shoulder, a parachute having a hole at the center of its top smaller than the periphery of said washer but larger than the body of the rod whereby the parachute is supported on the washer and the hole loosely embraces the upper end of the rod, the body of the parachute being folded and disposed within said housing, and radially expansible spreading means confined within said body and housing but freed when lifted from the housing by the rise of the parachute.

5. In a device of the class described, a housing of bowl shape having a hole in its bottom and its mouth slightly contracted, a barrel fixed in said hole, a projectile rod mounted in and adapted to be fired from the barrel, a parachute whose top is engaged by said rod and whose body is collapsed within the bowl, and a spiral spreader spring disposed in a horizontal plane and retained in compressed condition within said collapsed body by the bowl, but released from the body and bowl when drawn from the mouth of the latter.

In testimony that I claim the foregoing as my own I have hereto affixed my signature in presence of two witnesses.

CLINTON GRAY.

Witnesses:
 ROSE GORSON,
 C. C. SHINN.